United States Patent
DiMartino et al.

(10) Patent No.: US 8,126,806 B1
(45) Date of Patent: Feb. 28, 2012

(54) METHOD FOR LAUNCHING AN ELECTRONIC WALLET

(75) Inventors: Allison DiMartino, Overland Park, KS (US); Robert H. Miller, Leawood, KS (US); Elizabeth Roche, Prairie Village, KS (US); Kevin Zhu, Overland Park, KS (US)

(73) Assignee: Sprint Communications Company L.P., Overland Park, KS (US)

(*) Notice: Subject to any disclaimer, the term of this patent is extended or adjusted under 35 U.S.C. 154(b) by 330 days.

(21) Appl. No.: 11/949,759

(22) Filed: Dec. 3, 2007

(51) Int. Cl.
G06Q 40/00 (2006.01)

(52) U.S. Cl. .......................... 705/41; 340/5.7

(58) Field of Classification Search .............. 705/41, 705/67, 76; 713/183; 455/550; 380/2; 340/5.7
See application file for complete search history.

(56) References Cited

U.S. PATENT DOCUMENTS

| | | | |
|---|---|---|---|
| 5,453,601 A | 9/1995 | Rosen | |
| 5,496,966 A | 3/1996 | Hightower et al. | |
| 6,122,625 A | 9/2000 | Rosen | |
| 6,446,049 B1 | 9/2002 | Janning et al. | |
| 6,679,423 B2 | 1/2004 | Ijichi et al. | |
| 6,879,965 B2 | 4/2005 | Fung et al. | |
| 6,880,085 B1 | 4/2005 | Balczewski et al. | |
| 7,146,159 B1 | 12/2006 | Zhu | |
| 7,233,785 B2 | 6/2007 | Yamagishi et al. | |
| 7,269,256 B2 | 9/2007 | Rosen | |
| 7,413,113 B1 | 8/2008 | Zhu | |
| 7,434,723 B1 | 10/2008 | White et al. | |
| 7,475,044 B1 | 1/2009 | Kawai et al. | |
| 7,494,067 B1 | 2/2009 | Zhu | |
| 7,546,956 B2 | 6/2009 | Adams et al. | |
| 7,644,039 B1 | 1/2010 | Magee et al. | |
| 7,644,859 B1 | 1/2010 | Zhu | |
| 7,707,113 B1 | 4/2010 | DiMartino et al. | |
| 7,748,636 B2 | 7/2010 | Finn | |
| 7,819,307 B2 | 10/2010 | Lyons et al. | |
| 7,822,688 B2 | 10/2010 | Labrou et al. | |
| 7,926,714 B1 | 4/2011 | Zhu | |
| 8,055,184 B1 | 11/2011 | Dimartino et al. | |
| 8,060,449 B1 | 11/2011 | Zhu | |
| 2001/0005184 A1 | 6/2001 | Tsuno et al. | |
| 2002/0006806 A1* | 1/2002 | Kinnunen et al. | 455/550 |
| 2002/0011519 A1 | 1/2002 | Shults, III | |
| 2002/0052754 A1 | 5/2002 | Joyce et al. | |
| 2002/0062284 A1 | 5/2002 | Kawan | |
| 2002/0123971 A1 | 9/2002 | Maritzen et al. | |
| 2002/0147913 A1 | 10/2002 | Lun Yip | |
| 2003/0009382 A1 | 1/2003 | D'Arbeloff et al. | |
| 2003/0028481 A1 | 2/2003 | Flitcroft et al. | |

(Continued)

OTHER PUBLICATIONS

Office Action dated May 6, 2009, U.S. Appl. No. 11/863,632, filed Sep. 28, 2007, 11 pages.

(Continued)

*Primary Examiner* — Jason M Borlinghaus
*Assistant Examiner* — Samica L Norman

(57) ABSTRACT

A portable electronic device is disclosed. The portable electronic device comprises a contactless communication transceiver configured to provide payment information to a point-of-sale terminal, a first input device configured to receive inputs, and a processor. The first input device is selected from the group consisting of an accelerometer, a microphone, a camera, and a biometric sensor. The processor is configured to activate an electronic wallet based on inputs from at least one of the first input device and the contactless communication transceiver, to access the payment information in the electronic wallet, and to provide the payment information to the contactless communication transceiver.

3 Claims, 8 Drawing Sheets

U.S. PATENT DOCUMENTS

| | | | |
|---|---|---|---|
| 2003/0032409 | A1 | 2/2003 | Hutcheson et al. |
| 2003/0045328 | A1 | 3/2003 | Natsuno |
| 2003/0070080 | A1 | 4/2003 | Rosen |
| 2003/0083933 | A1 | 5/2003 | McAlear |
| 2003/0149900 | A1 | 8/2003 | Glassman et al. |
| 2004/0093265 | A1 | 5/2004 | Ramchandani et al. |
| 2004/0122771 | A1 | 6/2004 | Celi, Jr. et al. |
| 2004/0192303 | A1 | 9/2004 | Puthenkulam |
| 2004/0203601 | A1 | 10/2004 | Morriss et al. |
| 2005/0216424 | A1 | 9/2005 | Gandre et al. |
| 2005/0234778 | A1 | 10/2005 | Sperduti et al. |
| 2006/0073808 | A1 | 4/2006 | Buchert |
| 2006/0085847 | A1 | 4/2006 | Ikeuchi et al. |
| 2006/0136334 | A1 | 6/2006 | Atkinson et al. |
| 2006/0165060 | A1 | 7/2006 | Dua |
| 2006/0167823 | A1* | 7/2006 | York et al. .................. 705/76 |
| 2006/0191995 | A1 | 8/2006 | Stewart et al. |
| 2006/0211408 | A1 | 9/2006 | Yamagishi et al. |
| 2007/0010213 | A1 | 1/2007 | Dewan |
| 2007/0011461 | A1* | 1/2007 | Jeng ........................ 713/183 |
| 2007/0080215 | A1 | 4/2007 | Ramachandran et al. |
| 2007/0095892 | A1 | 5/2007 | Lyons et al. |
| 2007/0125840 | A1 | 6/2007 | Law et al. |
| 2007/0198410 | A1 | 8/2007 | Labgold et al. |
| 2007/0223685 | A1* | 9/2007 | Boubion et al. .............. 380/2 |
| 2007/0233615 | A1 | 10/2007 | Tumminaro |
| 2007/0234427 | A1 | 10/2007 | Gardner et al. |
| 2007/0244811 | A1 | 10/2007 | Tumminaro |
| 2007/0248232 | A1 | 10/2007 | Driscoll et al. |
| 2007/0255620 | A1 | 11/2007 | Tumminaro et al. |
| 2007/0255652 | A1 | 11/2007 | Tumminaro et al. |
| 2007/0281664 | A1 | 12/2007 | Kaneko et al. |
| 2007/0291995 | A1 | 12/2007 | Rivera |
| 2008/0059379 | A1 | 3/2008 | Ramaci et al. |
| 2008/0067240 | A1 | 3/2008 | Nakano et al. |
| 2008/0126260 | A1* | 5/2008 | Cox et al. .................. 705/67 |
| 2008/0201212 | A1 | 8/2008 | Hammad et al. |
| 2008/0238610 | A1* | 10/2008 | Rosenberg ................. 340/5.7 |
| 2008/0297306 | A1 | 12/2008 | Huajun et al. |
| 2008/0315989 | A1 | 12/2008 | Mirkazemi-Moud et al. |
| 2009/0018964 | A1 | 1/2009 | Liu et al. |
| 2009/0046858 | A1 | 2/2009 | Iyer et al. |
| 2009/0050689 | A1 | 2/2009 | Sako et al. |
| 2009/0078761 | A1 | 3/2009 | Sines |
| 2009/0097531 | A1 | 4/2009 | Franceschini et al. |
| 2009/0253409 | A1 | 10/2009 | Slavov et al. |
| 2009/0270174 | A1 | 10/2009 | Kelly et al. |
| 2009/0313689 | A1 | 12/2009 | Nyström et al. |
| 2010/0030651 | A1 | 2/2010 | Matotek et al. |
| 2010/0094752 | A1 | 4/2010 | Heath |
| 2010/0133337 | A1 | 6/2010 | Van Rensburg |
| 2011/0006112 | A1 | 1/2011 | Mueller |
| 2011/0053560 | A1 | 3/2011 | Jain et al. |

OTHER PUBLICATIONS

Office Action dated Sep. 14, 2009, 7 pages, U.S. Appl. No. 11/863,229, filed Sep. 27, 2007.
Office Action dated Feb. 17, 2009, U.S. Appl. No. 11/863,229, filed Sep. 27 2007, 14 pages.
Office Action dated Mar. 6, 2009, U.S. Appl No. 11/863,632, filed Sep. 28 2007, 8 pages.
DiMartino, Allison, "Method and System for Blocking Confidential Information at a Point-Of-Sale Reader from Eavesdropping," Filing Date—Sep. 27, 2007, U.S. Appl. No. 11/863,229.
DiMartino, Allison, "Method and System for Setting Levels of Electronic Wallet Security," Filing Date—Sep. 28, 2007, U.S. Appl. No. 11/863,632.
Office Action dated Dec. 24, 2009, U.S. Appl. No. 11/863,229, filed Sep. 27, 2007, 27 pages.
Notice of Allowance dated Dec. 1, 2009, U.S. Appl. No. 11/863,632, 17 pages.
Final Office Action dated Jun. 22, 2010, U.S. Appl. No. 11/863,229, filed Sep. 27, 2007, 21 pages.
Office Action dated Mar. 16, 2011, U.S. Appl. No. 11/863,229, filed Sep. 27, 2007.
DiMartino, Allison A., et al., Patent Application entitled, "System and Method for Active Jamming of Confidential Information Transmitted at a Point-of-Sale Reader," filed Jan. 30, 2008, U.S. Appl. No. 12/022,903.
Katzer, Robin D., et al., Patent Application entitled, "Control of Secure Elements through Point-of-Sale Device," filed Apr. 8, 2008, U.S. Appl. No. 12/099,771.
Zhu, Kevin, Patent Application entitled, "Partially Delegated Over-the-Air Provisioning of a Secure Element," filed Jan. 5, 2009, U.S. Appl. No. 12/348,371.
Persson, Sarah A.V., et al., Patent Application entitled, "Electronic Wallet Removal from Mobile Electronic Devices," filed Feb. 16, 2009, U.S. Appl. No. 12/371,901.
BlackBerry Enterprise Server for Microsoft Exchange, Version 4.0—Handheld Management Guide, Last Modified Aug. 18, 2006, Research in Motion Limited, Canada.
BlackBerry Enterprise Server for Microsoft Exchange, Version 4.0—Administration Guide, Last Modified Nov. 10, 2006, Research in Motion Limited, Canada.
Derfler, Frank J., et al., "How Networks Work," Sep. 2000, Que Corporation, A Division of MacMillan Computer Publishing, USA.
Office Action dated Mar. 11, 2011, U.S. Appl. No. 12/022,903.
Office Action dated Mar. 1, 2011, U.S. Appl. No. 12/099,771.
Office Action—Restriction dated Mar. 16, 2011, U.S. Appl. No. 12/348,371.
Office Action—Restriction dated Mar. 14, 2011, U.S. Appl. No. 12/371,901.
Office Action dated Apr. 14, 2011, U.S. Appl. No. 12/371,901.
Zhu, Kevin, Patent Application entitled, "Mobil Device Password System," filed Jan. 5, 2009, U.S. Appl. No. 12/348,377.
Office Action dated Jan. 13, 2011, U.S. Appl. No. 12/348,377.
Office Action dated May 24, 2011, U.S. Appl. No. 12/348,371.
Final Office Action dated Aug. 22, 2011, U.S. Appl. No. 11/863,229, filed Sep. 27, 2007.
Supplemental Notice of Allowance dated Sep. 13, 2011, U.S. Appl. No. 12/022,903.
Advisory Action dated Aug. 30, 2011, U.S. Appl. No. 12/348,377.
Notice of Allowance dated Sep. 9, 2011, U.S. Appl. No. 12/348,371.
Anonymous, "Sourcebook '96," Progressive Grocer Sourcebook '96 Supplement, Dec. 1995, pp. Cover-48, Maclean-Hunter Media Inc.
DiMartino, Allison A., et al., Patent Application entitled, "System and Method for Active Jamming of Confidential Information Transmitted at a Point-of-Sale Reader," filed Aug. 11, 2011, U.S. Appl. No. 13/207,645.
Notice of Allowance dated Jun. 21, 2011, U.S. Appl. No. 12/022,903.
Office Action dated Aug. 3, 2011, U.S. Appl. No. 12/099,771.
Final Office Action dated Jun. 20, 2011, U.S. Appl. No. 12/348,377.
Zhu, Kevin, Patent Application entitled, "Partially Delegated Over-the-Air Provisioning of a Secure Element," filed Jan. 5, 2009, U.S. Appl. No. 12/348,371.
Pre-Interview Communication dated Nov. 15, 2011, U.S. Appl. No. 13/207,645, filed on Aug. 11, 2011.
Advisory Action dated Oct. 21, 2011, U.S. Appl. No. 11/863,229, filed on Sep. 27, 2007.
Pre-Interview Communication dated Nov. 9, 2011, U.S. Appl. No. 12/702,270, filed on Feb. 8, 2010.
Supplemental Notice of Allowance dated Sep. 28, 2011, U.S. Appl. No. 12/022,903.
Supplemental Notice of Allowance dated Oct. 6, 2011, U.S. Appl. No. 12/348,371.
Final Office Action dated Oct. 14, 2011, U.S. Appl. No. 12/371,901.

* cited by examiner

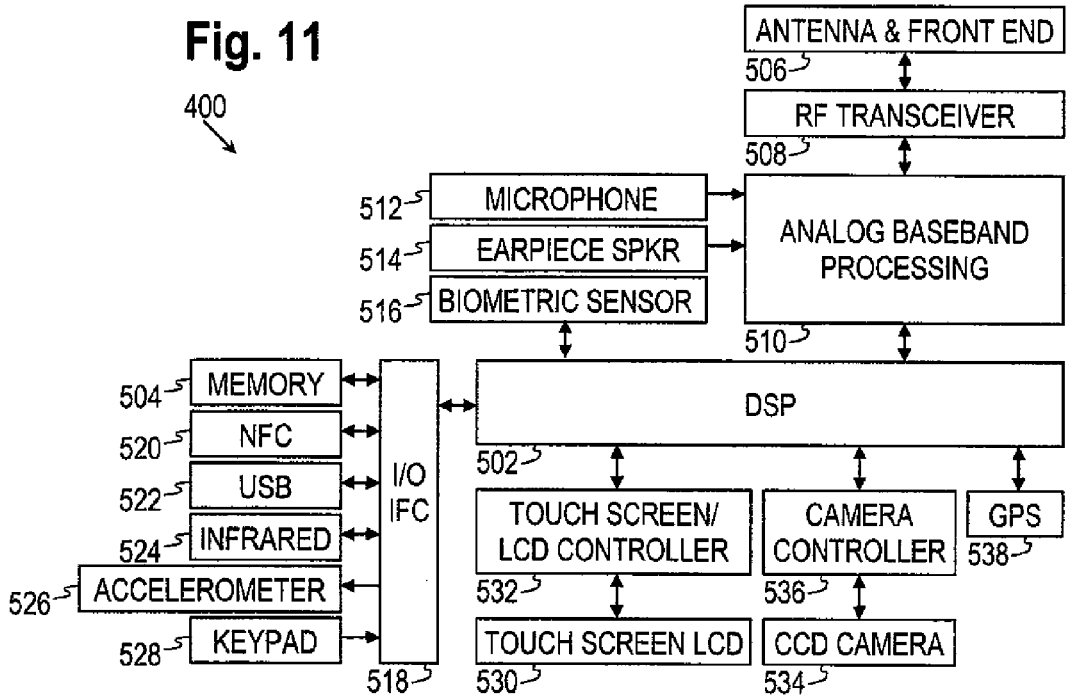
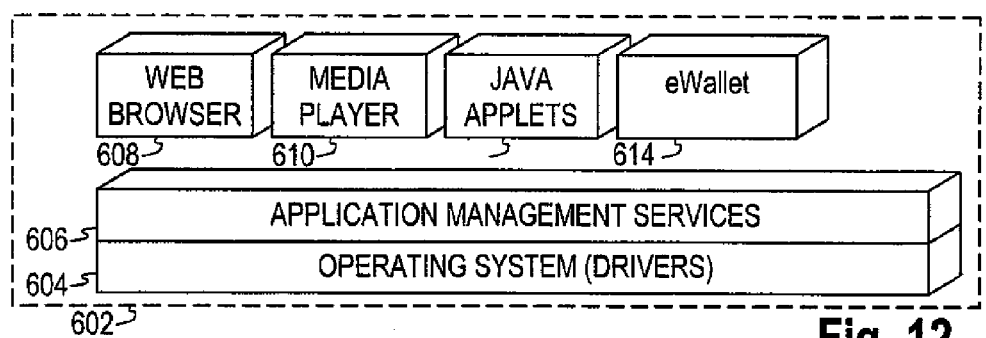

METHOD FOR LAUNCHING AN ELECTRONIC WALLET

CROSS-REFERENCE TO RELATED APPLICATIONS

None.

STATEMENT REGARDING FEDERALLY SPONSORED RESEARCH OR DEVELOPMENT

Not applicable.

REFERENCE TO A MICROFICHE APPENDIX

Not applicable.

BACKGROUND

A point-of-sale (POS) terminal or station may receive payment information associated with a purchase and seek authorization for payment from a back-end financial system, for example a credit card authorization service. The point-of-sale terminal may receive the financial information from a contactless card. A contactless card communicates with a point-of-sale terminal or other device at least in part without physically contacting the point-of-sale terminal, for example through radio frequency communication conducted in the proximity of the point-of-sale terminal. This radio frequency communication may include near field communication (NFC) technology.

Various payment cards, retail loyalty cards, and product coupons may be employed in different payment and or purchase scenarios. For example, in paying for groceries at a point-of-sale terminal, a customer may present a loyalty card issued by the grocery store chain, one or more product coupons, and either a credit card or a debit card. In another payment scenario, a commuter may present a transit card to obtain access to a mass transit vehicle.

SUMMARY

In an embodiment, a portable electronic device is disclosed. The portable electronic device comprises a contactless communication transceiver configured to provide payment information to a point-of-sale terminal, a first input device configured to receive inputs, and a processor. The first input device is selected from the group consisting of an accelerometer, a microphone, a camera, and a biometric sensor. The processor is configured to activate an electronic wallet based on inputs from at least one of the first input device and the contactless communication transceiver, to access the payment information in the electronic wallet, and to provide the payment information to the contactless communication transceiver.

In another embodiment, a method of activating an application is disclosed. The method comprises receiving inputs on a portable electronic device to configure an activation input to select activation of a hidden application of the portable electronic device, receiving the activation input, and activating the hidden application of the portable electronic device in response to receiving the activation input. The hidden application of the portable electronic device is not accessible through any menu selection displayed on a visual display of the portable electronic device.

In an additional embodiment, a method of completing a transaction is disclosed. The method comprises receiving a first input to select one of a plurality of payment cards for payment transfer, the payment cards provided by an electronic wallet application. The method also comprises launching the electronic wallet application on the portable electronic device, the electronic wallet application configured to provide access to a payment transfer information of the selected payment card. The method further comprises transmitting the payment transfer information to a point-of-sale terminal, wherein the transmitting is performed using contactless communication.

These and other features will be more clearly understood from the following detailed description taken in conjunction with the accompanying drawings and claims.

BRIEF DESCRIPTION OF THE DRAWINGS

For a more complete understanding of this disclosure, reference is now made to the following brief description, taken in connection with the accompanying drawings and detailed description, wherein like reference numerals represent like parts.

FIG. 11 is a block diagram of a handset according to at least one embodiment of the disclosure.

FIG. 12 is a block diagram of a software architecture of a handset according to at least one embodiment of the disclosure.

DETAILED DESCRIPTION

It should be understood at the outset that although an illustrative implementation of one or more embodiments are provided below, the disclosed systems and/or methods may be implemented using any number of techniques, whether currently known or in existence. The disclosure should in no way be limited to the illustrative implementations, drawings, and techniques illustrated below, including the exemplary designs and implementations illustrated and described herein, but may be modified within the scope of the appended claims along with their full scope of equivalents.

A myriad of methods for conveniently opening, launching, or accessing an electronic wallet or other application on a portable electronic device are disclosed. In some embodiments, when not launched, the electronic wallet or other application is hidden from view on a display of the device to promote security of personal financial information or other confidential information in the event the phone is stolen or lost. The electronic wallet is launched by a first input or a combination of the first input and a second input, for example a movement input, a voice input, a camera image, or an audio input. In some contexts herein, the word cue may be used interchangeably with the word input, for example a movement input may also be referred to as a movement cue. In another embodiment, the electronic wallet may be launched automatically when radiation from a near field communication (NFC) point-of-sale terminal is detected. In some embodiments the input or input combinations that launch the electronic wallet also concurrently select one of a plurality of payment cards, for example a specific credit card or debit card. The input sequences that launch the electronic wallet may also select one of a plurality of electronic wallets mounted on or stored on the device.

Some additional information related to point-of-sale systems is provided in U.S. patent application Ser. No. 11/221,172, entitled "Alternate Authorization for Proximity Card," filed Sep. 7, 2005, by Kevin Zhu, which is incorporated herein by reference for all purposes.

Figure 1:
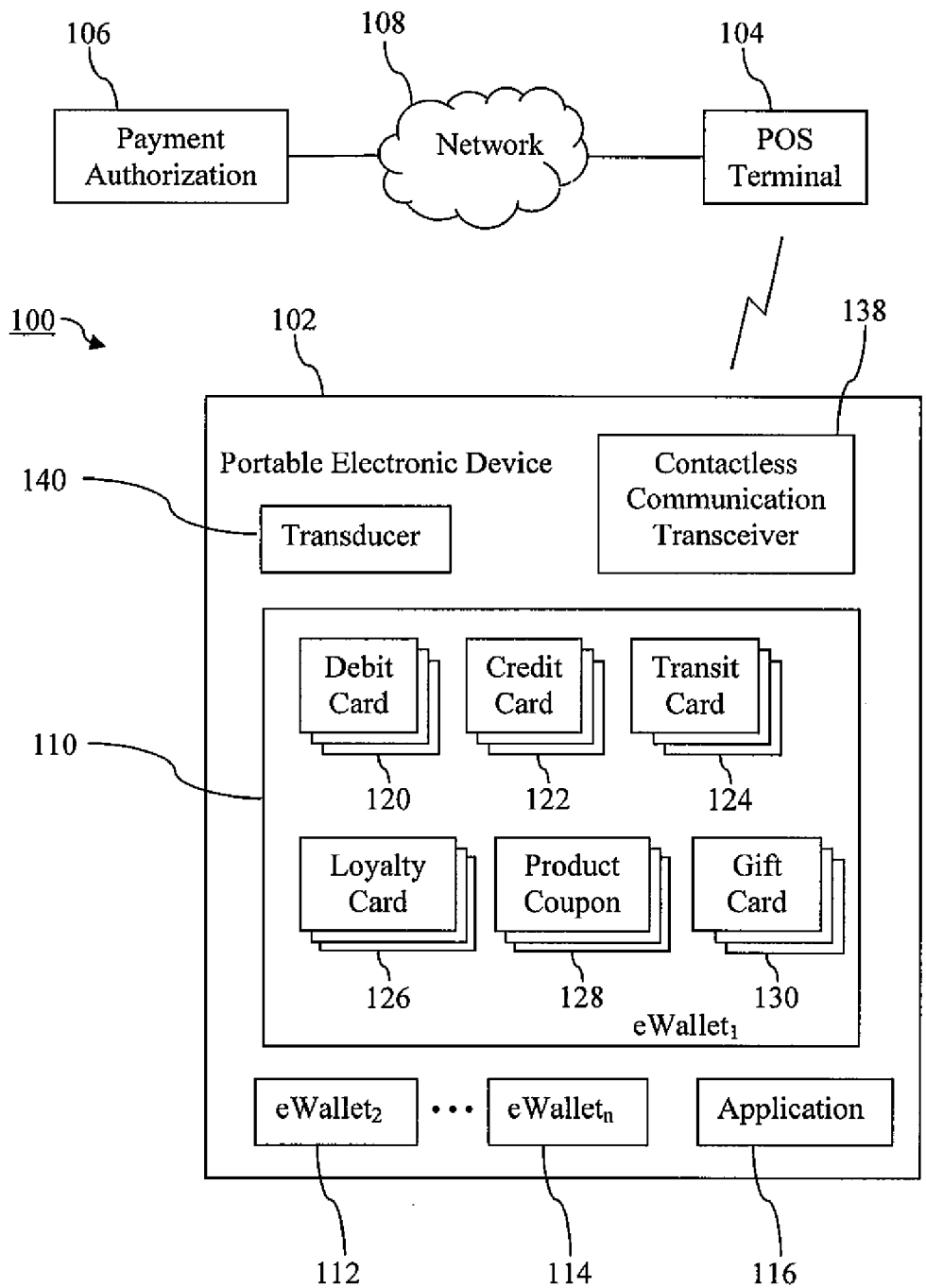
FIG. 1 is an illustration of a payment system according to an embodiment of the disclosure.

Turning now to FIG. 1, a system 100 for completing payment transactions according to an embodiment of this disclosure is discussed. The system 100 comprises a portable electronic device 102, a point-of-sale (POS) terminal 104, a payment authorization center 106, and a network 108. A payment for a product or service may be made electronically by the device 102 through contactless communication with the POS terminal 104, for example by communicating payment information such as a credit card or a transit card account number. For purposes of the present disclosure, contactless communication is intended to include a wide variety of communication means including near field communication (NFC) technology, infra-red, ultra-sonic, optical, radio frequency, wireless, Bluetooth, Wi-Fi, and other communication links that do not involve direct physical contact. In an embodiment, the POS terminal 104 completes the payment transaction by handshaking with the payment authorization center 106, communicating with the payment authorization center 106 through the network 108. In another embodiment, the POS terminal 104 completes the payment transaction without communicating with the payment authorization center 106, for example when the payment information for a debit card is provided by the device 102.

The POS terminal 104 may be embodied as a general purpose computer system, to be discussed in greater detail hereinafter. The POS terminal 104 communicates via contactless communication with the device 102 by any of a variety of means including near field communication (NFC) technology, infra-red, ultra-sonic, optical, radio frequency, Bluetooth, Wi-Fi, and other communication links. The POS terminal 104 may be connected to databases or networked to servers (not shown) which provide product and service pricing information, including any discounting associated with a loyalty card and/or product coupons. In an embodiment, the POS terminal 104 may include a device for scanning a product, for example a bar code reader or radio frequency identification (RFID) reader, to identify a product and to add the associated cost to an accumulating purchase total.

The payment authorization center 106 may authenticate and authorize charges to a credit card such as VISA card, AMERICANEXPRESS card, MASTERCARD card, DISCOVER card, gasoline company card, or other credit card. The authorization handshake may require transmission of account identification, for example an account number or a credit card number. Additionally, the authorization handshake may require further authentication information such as a personal identification number (PIN), a driver's license number, a security code associated with the credit card, or other authentication information. If the payment authorization center 106 approves the transaction, the payment authorization center 106 charges the appropriate account in the amount of the transaction and sends payment approval. The payment authorization center 106 may be implemented as a general purpose computer system.

The network 108 may be any of a public switched telephone network (PSTN), a public data network (PDN), or a combination thereof.

The portable electronic device 102 may be any of a variety of devices including but not limited to a mobile phone, a personal digital assistant (PDA), a laptop computer, a tablet computer, or other portable electronic device. An exemplary embodiment of a handset suitable to implementing several embodiments of this disclosure, for example a mobile phone and a PDA, is discussed in detail hereinafter.

The device 102 includes one or more applications that provide services and functionality to a user, such as a mobile phone subscriber or a PDA user. These applications may include, but are not limited to, an electronic wallet, an email service, an address book, a contacts list, a spreadsheet, a scheduler, a virtual private network (VPN) portal, a web browser, and other applications. In an embodiment, these applications may be launched or activated or started by a number of methods including selecting a menu item shown on a display of the device 102 and/or pressing keys on a keyboard of the device 102. In other embodiments, these applications may be launched by other methods, for example by voice activation input or cue, by distinctive movement input sensed by an accelerometer within the device 102, and by other methods. When an application is inactive or not yet launched, accessing the functionality of the application may involve first loading at least portions of the application into a memory area that is more accessible or more rapidly accessible to a processor of the device 102. In an embodiment, this process of loading at least portions of the application into the memory area accessible to the processor of the device 102 is what is referred to in the expression launching or activating the application.

In an embodiment one or more of the applications may be hidden applications, for example the application may not be identified in a menu selection that is shown in the display of the device 102 or accessible through standard sequences of selecting displayed menu selections. Configuring an application to be hidden may provide desirable security benefits, for example making an electronic wallet more difficult to launch by an unauthorized person who may have discovered a lost or misplaced device 102 or may have stolen the device 102, thereby preventing unauthorized credit card purchases or depletion of debit cards included in the electronic wallet. If the application provides access to expensive communications services, hiding the application may prevent unauthorized use of the communication services and hence avoidance of the associated charges. If the application provides access to confidential information, for example competitive pricing information, marketing plans, customer or contact lists, hiding the application may prevent industrial espionage directed to stealing that confidential information. The hidden applications may be launched through distinctive input sequences configured for the device 102 and known to the authorized users of the device 102.

An electronic wallet application, also referred to as an eWallet, provides a variety of financial and payment capabilities. The electronic wallet application supports paying for products or services with the device 102 in much the same way as presenting a credit card, a debit card, or a transit card for payment. Additionally, the electronic wallet application may promote paying from a payment account.

In an embodiment the device 102 includes a plurality of electronic wallets, for example a first electronic wallet 110, a second electronic wallet 112, and a third electronic wallet 114. Each of the several wallets 110, 112, and 114 may be associated with different members of a family, for example a father, a mother, and a child. Alternatively, each of the several wallets 110, 112, and 114 may be associated with different employees of a business firm. Alternatively, each of the wallets 110, 112, 114 may be associated with different roles of an individual, for example a personal wallet, a business wallet, and a social organization wallet. The individual may use the personal wallet for buying a birthday gift for a spouse, use the business wallet to pay for business related expenses, and use the social organization wallet to pay for food for a group campout. In an embodiment the electronic wallet launching input sequence may select one of the electronic wallets 110, 112, 114. In another embodiment the electronic wallet launching sequence may trigger the display to show a selector, for example a dialog box or window, to select one of the electronic wallets 110, 112, 114.

In an embodiment, the first electronic wallet 110 includes one or more debit cards 120, credit cards 122, transit cards 124, loyalty cards 126, product coupons 128, and gift cards 130. A loyalty card 126 may be used by a retail store, for example a grocery store, to link or associate a purchase session with a customer, perhaps for the purposes of conducting marketing research, customer purchasing behavior research, etc. A gift card 130 may be a debit card issued by a specific store or business, for example a book store gift card or a restaurant gift card. In an embodiment when the first electronic wallet 110 is launched all of the payment information contained by the wallet, including the debit cards 120, the credit cards 122, the transit cards 124, the loyalty cards 126, the product coupons 128, and the gift cards 130 become immediately accessible. In another embodiment at least some of the payment information is protected, for example requiring the designation of a PIN to make one of the credit cards 122 accessible. In an embodiment, accessibility of the debit cards 120, the credit cards 122, the transit cards 124, the loyalty cards 126, the product coupons 128, and the gift cards is configurable on the device 102 by a user.

This disclosure contemplates a wide variety of methods of launching or activating a variety of applications, for example an application 116, both hidden applications and other applications, including, but not limited to, a spreadsheet application, an address book application, a contact list application, a VPN application, and an electronic wallet application, for example the electronic wallets 110, 112, 114. In some embodiments, a contactless communication transceiver 138, for example an NFC transceiver, may launch an application, for example the first electronic wallet 110, when an NFC emission is detected by the contactless communication transceiver 138, for example from the POS terminal 104.

In some embodiments one or more transducers 140 may provide input to the device 102 that is used to trigger launching the first electronic wallet 110 or other application. In an embodiment, a distinctive movement of the device 102 may be sensed by the transducer 140, for example an accelerometer, and input to the device 102 which launches the electronic wallet 110 in response to the distinctive movement. In an embodiment, a distinctive movement of the device 102 while the number "1" is activated on a keypad of the device 102 may trigger the device 102 to launch the first electronic wallet 110, while the same distinctive movement of the device 102 while the number "2" is activated on the keypad may trigger the device 102 to launch the second electronic wallet 112. A variety of distinctive movements of the device by a user readily suggest themselves including, but not limited to, circular movements, left-to-right movements, up-to-down movements, yawing movements, pitching movements, rolling movements, translation movements in any of three axes of translational movement, etc.

Figure 2:
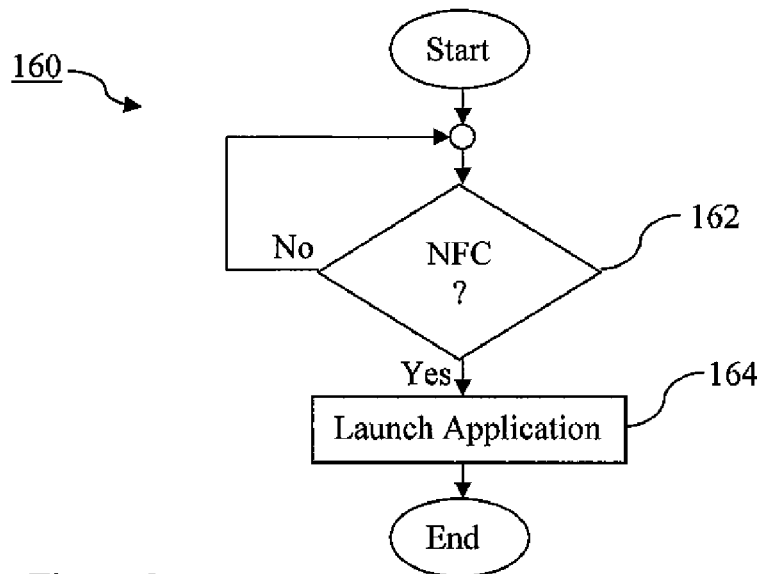
FIG. 2 is a flow chart of a method of launching an application on a portable electronic device in the presence of a near field communication (NFC) transmitter according to an embodiment of the disclosure.

Turning now to FIG. 2, a method 160 of launching an application, for example the first electronic wallet 110, is discussed. In block 162, if the device 102 is brought into proximity to the POS terminal 104 and detects the NFC signal emitted by the POS terminal 104 the method 160 proceeds to block 164. In block 164, in response to detecting the NFC signal, in an embodiment the device 102 may launch or activate the first electronic wallet 110. In another embodiment, the device 102 may have multiple electronic wallets installed and may be configured to automatically select one of the electronic wallets 110, 112, 114 when the device 102 detects the NFC signal radiated by the POS terminal 104. The device 102 may retain this configuration as state information until the device 102 is reconfigured. In a further embodiment, however, when multiple electronic wallets 110, 112, 114 are installed on the device 102, the device 102 may display a dialog box prompting for a selection of one of the electronic wallets 110, 112, 114 when the device 102 detects the NFC RF of the POS terminal 104. In an embodiment, the NFC signal may identify a store or business associated where the POS terminal 104 is located, and the device 102 may select the payment card 120, 122, 124 based in part upon the identification of the store. Further, the device 102 may provide a reminder to the user that an applicable gift card 130 is available, indicate the funds remaining on the gift card 130, and provide a selection button for paying at least in part with the selected gift card 130.

Figure 3:
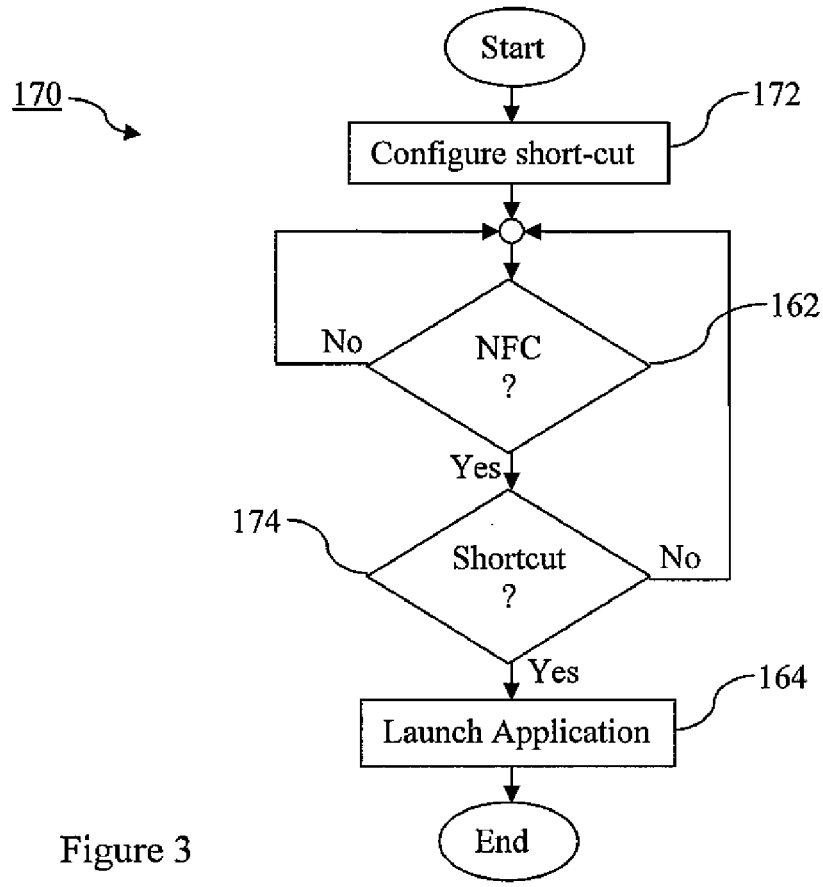
FIG. 3 is a flow chart of another method of launching an application on a portable electronic device in the presence of an NFC transmitter according to an embodiment of the disclosure.

Turning now to FIG. 3, a method 170 of launching the first electronic wallet 110 on the device 102 is discussed. In block 172, optionally an activation input for launching the first electronic wallet is configured on the device 102. Alternately, the device 102 may be pre-configured to know the activation input. In block 174, if the device 102 receives the activation input while concurrently detecting the NFC signal radiated by the POS terminal 104, at block 164 the device 102 launches the first electronic wallet 110.

The activation input may include a distinctive movement input or cue sensed by the transducer 140, a password entered on a keypad of the device 102, a drawn input on a touch screen or touch pad of the device 102, an audio input such as a tapping sound pattern, a voice input, or a biometric input. The distinctive movement input, sensed by the transducer 140 implemented as an accelerometer, might be, for example, a rapid rotation of the device 102 around an approximately vertical axis in an approximately horizontal plane. Other distinctive movements are also contemplated by this disclosure. The biometric input may be provided by a fingerprint sensor or by a retina scan provided by a camera or other sensor integral with the device 102. Configuring the device 102 for the movement input and/or the biometric input may involve entering an operational control mode of the device 102 and imparting the movement and/or biometric signature to the device 102 several times. The biometric signature may be referred to as a biometric image. The biometric signature and/or biometric image may be a recording of a biometric characteristic, for example a scanned image of a retina obtained with a camera of the device 102, a photo or other image of a fingerprint.

The activation input provides a convenient alternative to conventional traversing of a series of menu offerings to arrive at a desired selector control. Additionally, the activation input may provide desirable security in the case that the device 102 is lost or stolen, making launching of the first electronic wallet 110 more difficult for those not aware of the configured activation.

In an embodiment, the device 102 may have multiple electronic wallets installed and may be configured to automatically select one of the electronic wallets 110, 112, 114 when the device 102 receives the activation input while concurrently detecting the NFC RF radiated by the POS terminal 104. Alternately, the device 102 may be configured to associate different activation cues with a different one of the electronic wallets 110, 112, and 114.

Figure 4:
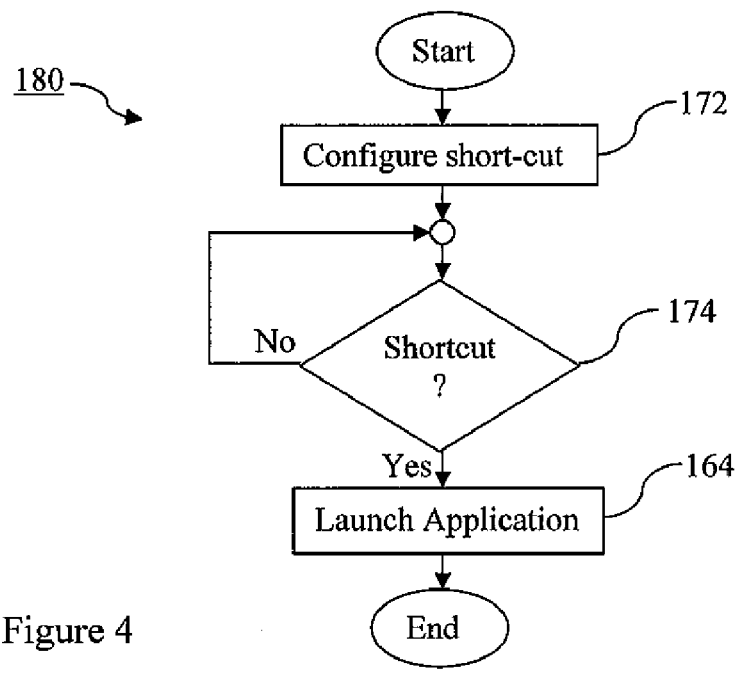
FIG. 4 is a flow chart of a method of launching an application on a portable electronic device based on a shortcut according to an embodiment of the disclosure.

Turning now to FIG. 4, a method 180 for launching an application on the device 102 is discussed. In an embodiment the application may be a hidden application, as discussed above. In block 172, optionally an activation input for launching the application is configured on the device 102. Alternately, the device 102 may be pre-configured to know the activation input. In block 174, if the device 102 receives the activation input, at block 164 the device 102 launches the application. In an embodiment, the device 102 may be configured to launch different applications based on receiving or detecting different activations. For example, a first movement may be configured as the activation to an email application of the device 102 and a second movement may be configured as the activation to a streaming video application of the device 102.

Figure 5:
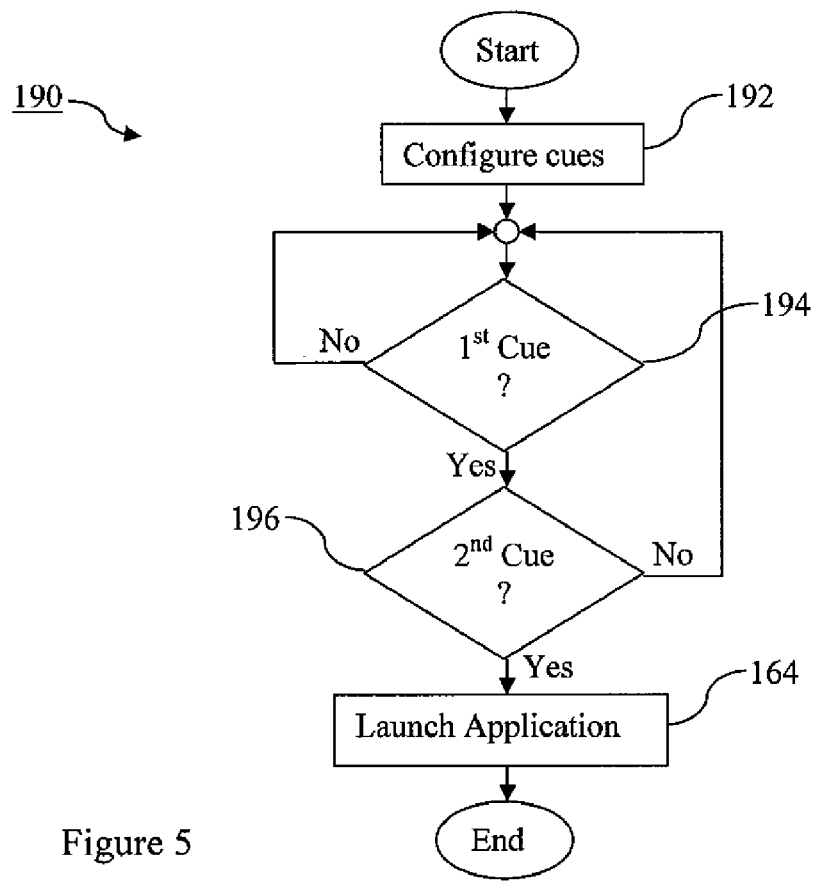
FIG. 5 is a flow chart of a method of launching an application on a portable electronic device based on a first and second cue according to an embodiment of the disclosure.

Turning now to FIG. 5, a method 190 for launching an application on the device 102 is discussed. In block 192, optionally a first cue or input and a second cue or input are configured for the device 102. In an embodiment, however, the first and second cues may be pre-configured on the device 102. In block 194 if the first cue is detected, the method 190 proceeds to block 196, where if the second cue is detected concurrently with detection of the first cue, or before expiration of a time-out timer that may be started upon the event of detecting the first cue, the application is launched on the device 102.

In an embodiment, multiple pairs of first and second cues may be configured to launch different applications, for example a first cue associated with an email application and a second cue associated with the email application, a first cue associated with a streaming video application and a second cue associated with the streaming video application. Additionally, multiple pairs of first and second cues may be configured to launch different electronic wallets 110, 112, 114. In another embodiment, the first cue may launch the first electronic wallet 110, and the second cue may select a specific application to be launched on the device 102. In another embodiment, the first cue may select a specific application to be launched on the device 102, and the second cue may launch the wallet 110 and launch the application selected by the first cue. A number of other cue combinations will readily occur to one skilled in the art, all of which are contemplated by the present disclosure.

Figure 6:
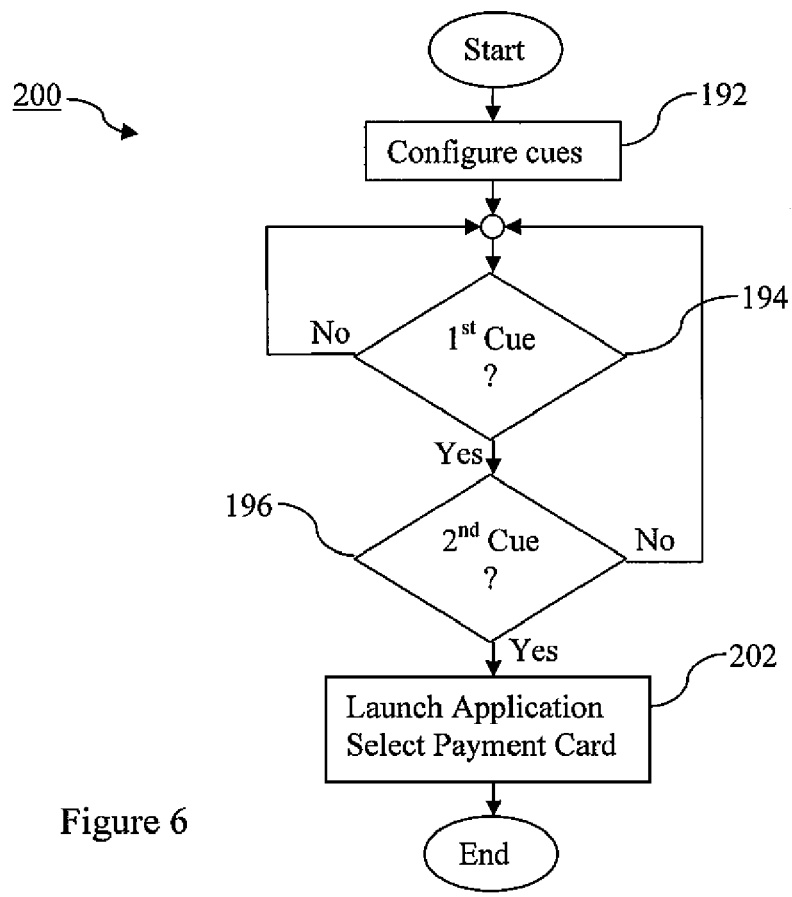
FIG. 6 is a flow chart of a method of launching an application on a portable electronic device and selecting a payment card based on a first and second cue according to an embodiment of the disclosure.

Turning now to FIG. 6, a method 200 for launching an application, for example the first electronic wallet 110, and selecting a payment card on the device 102 is discussed. The method 200 is similar to the method 190, but in block 202 the first and second cues may select a payment card for use with the application being launched, for example a credit card accessed via the first electronic wallet 110 being launched. Either the first cue or the second cue may identify a payment card from a plurality of payment cards. For example, pressing and holding a "*" key on the keypad of the device 102 may provide the first cue and rotating the device 102 rapidly about a vertical axis may provide the second cue and may launch the first electronic wallet 110 and also select a first credit card for payment. Pressing and holding the "*" key on the keypad of the device 102 may provide the first cue and rotating the device 102 rapidly about a horizontal axis may launch the first electronic wallet 110 and also select a second credit card for payment. In other embodiments other cues and combinations of cues may be employed. In an embodiment, activating the first cue, for example pressing and releasing the "*" key may start a time-out timer, and if the second cue is received before the time-out timer expires the first electronic wallet 110 is launched and a payment card is selected.

Figure 7:
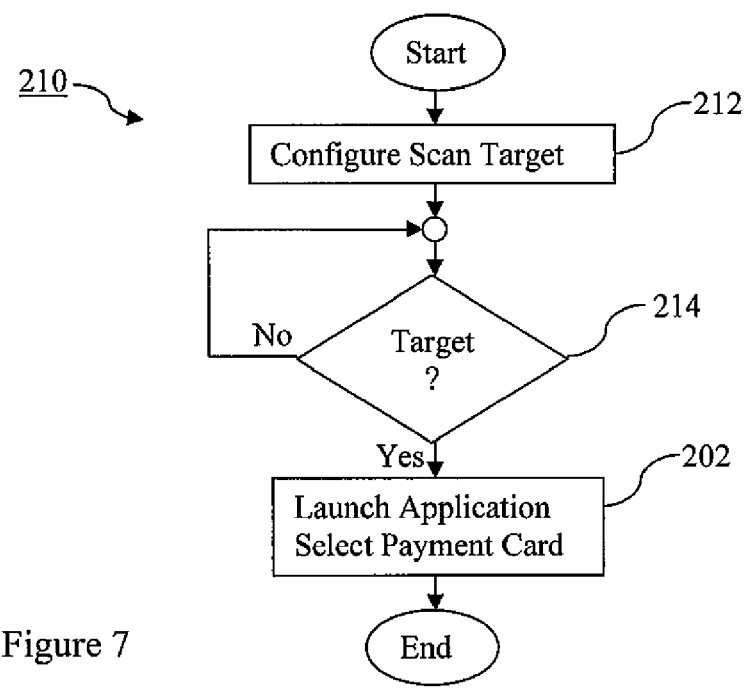
FIG. 7 is a flow chart of a method of launching an application on a portable electronic device based on scanning a target according to an embodiment of the disclosure.

Turning now to FIG. 7, a method 210 for launching or activating n application, for example the first electronic wallet 110, and selecting a payment card on the device 102 is discussed. In block 212 a scanning target is configured for the device 102 to associate the scanning target with one of the payment cards 120, 122, 124. In an embodiment one of the loyalty cards 126 may be associated with the scanning target. In an embodiment one of the gift cards 130 may be associated with the scanning target. The scanning target may be an image or bar code associated with a specific product or service vendor, for example a grocery store or a mass transportation service. The image may be a distinctive icon associated with the credit card, for example a logo of a store, or a credit card, or other logo. The bar code may be a linear bar code or a two-dimensional bar code, for example a bar code designed to be reliably read by a low-quality scanner or a camera and from various reading angles and orientations. The two-dimensional bar codes may include SEMACODE, SHOTCODE, and other two-dimensional bar codes.

In block 214 a target is scanned, and if the scanned target matches one of the configured scanning targets, in block 202 the first electronic wallet 110 is launched and an appropriate payment card 120, 122, 124 is selected. In an embodiment, the target may be provided as a sticker near or at the POS terminal 104. In an embodiment, the appropriate loyalty card 126 is selected and information associated with the loyalty card 126 is shared with the POS terminal 104 and possibly appropriate product coupons 128. In an embodiment, the target may be provided as a sticker at various locations in a store, allowing the device 102 to scan the target, to launch the first electronic wallet application 110, and further to display one or more product coupons 128 that may be associated with the store, thereby promoting shopping informed by the knowledge of the availability of the product coupons 128. In an embodiment, the device 102 may provide a reminder to the user that an applicable gift card 130 is available, indicate the funds remaining on the gift card 130, and provide a selection button for paying at least in part with the selected gift card 130. In another embodiment, the target is scanned to select an appropriate payment card 120, 122, 124 and a second input cue may launch the first electronic wallet 110 with the selected payment card 120, 122, 124 active. In another embodiment, when the device 102 scans the target, one or more product coupons are identified, and the user launches the first electronic wallet 110 with the second input cue.

Figure 8:
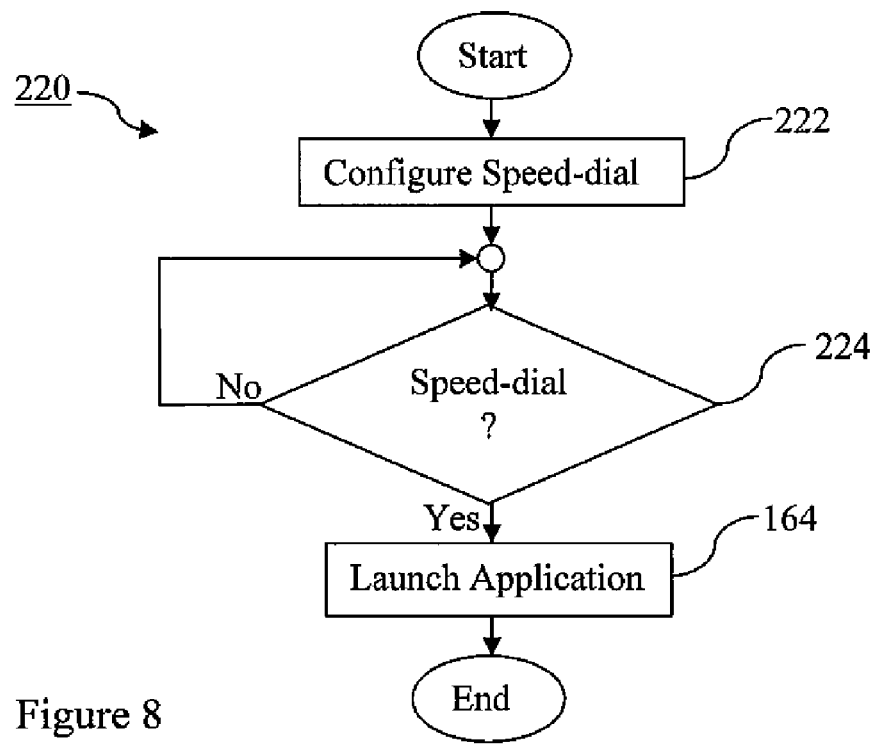
FIG. 8 is a flow chart of a method of launching an application on a portable electronic device based on a speed-dial selection according to an embodiment of the disclosure.

Turning now to FIG. 8, a method 220 for launching or activating the first electronic wallet 110 on the device 102 is discussed. In block 222, optionally a speed-dial input for launching the first electronic wallet 110 is configured on the device 102. Alternatively, the device 102 may be pre-configured to know the speed-dial input. The speed-dial may be defined as a string or ordered sequence of dialing inputs. The dialing inputs consist of the digits 0 through 9, the asterisk, and the pound sign. In block 224, if the device 102 receives the speed-dial input, at block 164 the device 102 launches the first electronic wallet 110. In an embodiment, an activation input may be provided to cue the device 102 to process the speed-dial input, for example receiving an input from the dialing key input or another input cue. In an embodiment, the device 102 may be placed in a dialing mode or a phone mode before block 224 to promote the device 102 processing the speed-dial input. The speed-dial input may be defined, for example, as a seven digit number and/or a ten digit number. It is contemplated that such a seven digit or ten digit speed-dial input may enjoy the benefit of seeming to be a standard phone number and hence less readily discovered by an identify thief. It is contemplated that the speed-dial might be added to a contacts list on the device 102, associated with some name. The speed-dial number might then be selected through the contacts list. In another embodiment, the speed-dial input may be defined as a special character such as an asterisk followed by four numeric digits. In another embodiment, however, different dialing strings may be employed as speed-dial inputs. In an embodiment, a password may be input along with the speed-dial input, and the device 102 may process the password substantially concurrently with the speed-dial input, thereby avoiding the need for presenting a password dialog window before providing full access to the functions of the first electronic wallet. The password input and speed-dial input may be combined in a variety of ways. For example, the password may be appended at the end of the speed-dial input, the password input may be pre-pended in front of the speed-dial input, or the password input may be intermingled in some manner with the speed-dial input. In an embodiment, the method 220 may be used to launch or to activate other applications including hidden applications.

Figure 9:
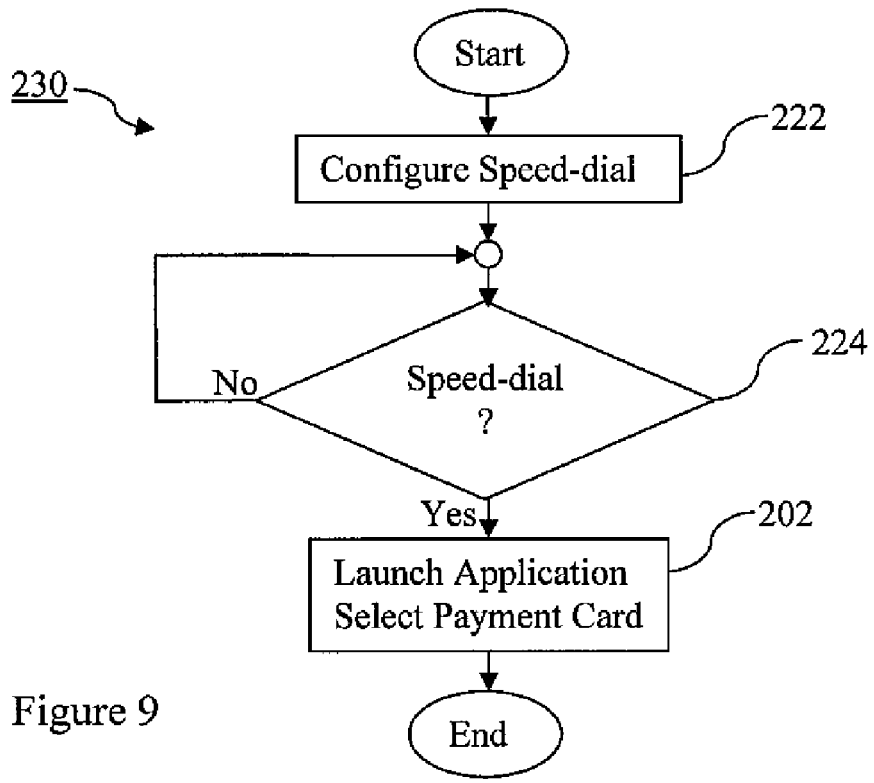
FIG. 9 is a flow chart of a method of launching an application on a portable electronic device and selecting a payment card based on a speed-dial selection according to an embodiment of the disclosure.

Turning now to FIG. 9, a method 230 for launching or activating the first electronic wallet 110 on the device 102 is discussed. In block 222, optionally a speed-dial input for launching the first electronic wallet 110 is configured on the device 102. This configuration may also configure one of the payment cards 120, 122, 124 and one of the electronic wallets 110, 112, 114 to associate with a specific speed-dial input. Alternately, the device 102 may be pre-configured to know the speed-dial input and its association with the payment cards 120, 122, 124 and with the electronic wallets 110, 112, 114. In block 224, if the device 102 receives the speed-dial input, at block 202 the device 102 launches the first electronic wallet 110 and selects the payment card 120, 122, 124. In an embodiment, the device 102 may be configured to launch different electronic wallets 110, 112, 114 based on receiving or detecting different speed-dial inputs. In an embodiment, different biometric signatures associated with a user, for example fingerprints of different fingers, may be used to select different applications 116 and or electronic wallets 110, 112, 114.

Figure 10:
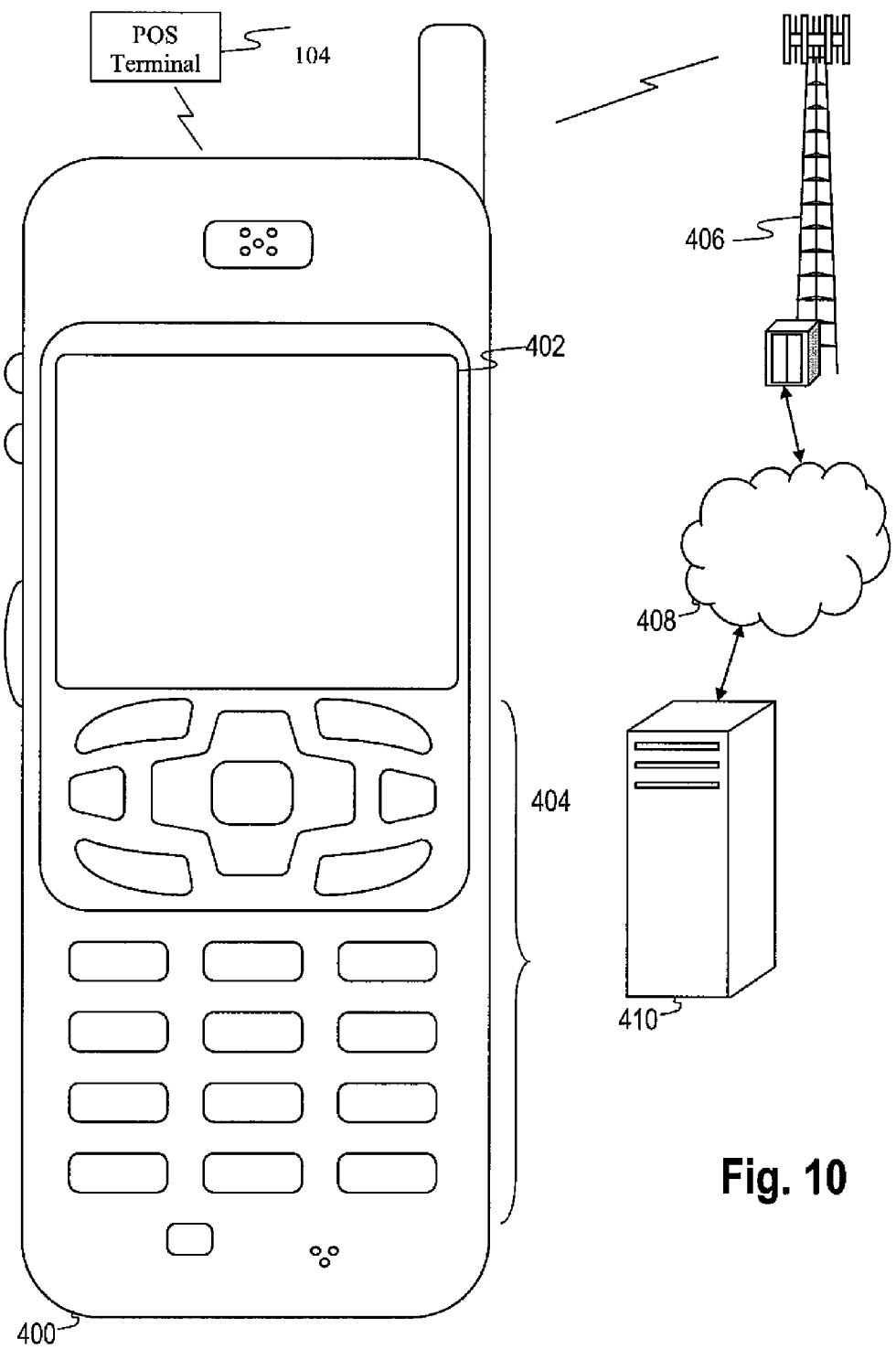
FIG. 10 is an illustration of a handset according to at least one embodiment of the disclosure.

FIG. 10 shows a wireless communications system including a handset 400. FIG. 10 depicts the handset 400, which is operable for implementing aspects of the present disclosure, for example the portable electronic device 102, but the present disclosure should not be limited to these implementations. Though illustrated as a mobile phone, the handset 400 may take various forms including a wireless handset, a pager, a personal digital assistant (PDA), a portable computer, a tablet computer, or a laptop computer. Many suitable handsets combine some or all of these functions. In some embodiments of the present disclosure, the handset 400 is not a general purpose computing device like a portable, laptop or tablet computer, but rather is a special-purpose communications device such as a mobile phone, wireless handset, pager, or PDA. The handset 400 may support specialized work assignments such as inventory control, job control, and/or task management functions.

The handset 400 includes a display 402 and a touch-sensitive surface or keys 404 for input by a user. In an embodiment, the display 402 may be a touch-sensitive surface, which may be referred to as a touch screen. In an embodiment, the keys 404 may be separate from a touch-sensitive, non-display surface, which may be referred to as a touch pad (not shown). The handset 400 may present options for the user to select, controls for the user to actuate, and/or cursors or other indicators for the user to direct. The handset 400 may further accept data entry from the user, including numbers to dial or various parameter values for configuring the operation of the handset. The handset 400 may further execute one or more software or firmware applications in response to user commands. These applications may configure the handset 400 to perform various customized functions in response to user interaction. Additionally, the handset 400 may be programmed and/or configured over-the-air, for example from a wireless base station, a wireless access point, or a peer handset 400.

The handset 400 may execute a web browser application which enables the display 402 to show a web page. The web page may be obtained via wireless communications with a cell tower 406, a wireless network access node, a peer handset 400 or any other wireless communication network or system. The cell tower 406 (or wireless network access node) is coupled to a wired network 408, such as the Internet. Via the wireless link and the wired network, the handset 400 has access to information on various servers, such as a server 410. The server 410 may provide content that may be shown on the display 402. Alternately, the handset 400 may access the cell tower 406 through a peer handset 400 acting as an intermediary, in a relay type or hop type of connection. The handset 400 may conduct payment transactions using contactless communications means with the POS terminal 104, for example using a contactless communication transceiver (not shown).

FIG. 11 shows a block diagram of the handset 400. While a variety of known components of handsets 400 are depicted, in an embodiment a subset of the listed components and/or additional components not listed may be included in the handset 400. The handset 400 includes a digital signal processor (DSP) 502 and a memory 504. As shown, the handset 400 may further include an antenna and front end unit 506, a radio frequency (RF) transceiver 508, an analog baseband processing unit 510, a microphone 512, an earpiece speaker 514, a biometric sensor 516, an input/output interface 518, a near field communication (NEC) transceiver card or other contactless communication transceiver 520, a universal serial bus (USB) port 522, an infrared port 524, an accelerometer or other transducer 526, a keypad 528, a touch screen liquid crystal display (LCD) with a touch sensitive surface 530, a touch screen/LCD controller 532, a charge-coupled device (CCD) camera 534, a camera controller 536, and a global positioning system (GPS) sensor 538. In an embodiment, the handset 400 may include another kind of display that does not provide a touch sensitive screen. In an embodiment, the DSP 502 may communicate directly with the memory 504 without passing through the input/output interface 518. In an embodiment, the handset 400 may further include a Bluetooth interface. In an embodiment, the contactless communication transceiver 520 may employ Bluetooth communication technology.

The DSP 502 or some other form of controller or central processing unit operates to control the various components of the handset 400 in accordance with embedded software or firmware stored in memory 504 or stored in memory contained within the DSP 502 itself. In addition to the embedded software or firmware, the DSP 502 may execute other applications stored in the memory 504 or made available via information carrier media such as portable data storage media like a removable memory card (not shown) or via wired or wireless network communications. The application software may comprise a compiled set of machine-readable instructions that configure the DSP 502 to provide the desired functionality, or the application software may be high-level software instructions to be processed by an interpreter or compiler to indirectly configure the DSP 502.

The antenna and front end unit 506 may be provided to convert between wireless signals and electrical signals, enabling the handset 400 to send and receive information from a cellular network or some other available wireless communications network or from a peer handset 400. In an embodiment, the antenna and front end unit 506 may include multiple antennas whereby to support beam forming and/or multiple input multiple output (MIMO) operations. As is known to those skilled in the art, MIMO operations may provide spatial diversity which can be used to overcome difficult channel conditions and/or increase channel throughput. The antenna and front end unit 506 may include antenna tuning and/or impedance matching components, RF power amplifiers, and/or low noise amplifiers.

The RF transceiver 508 provides frequency shifting, converting received RF signals to baseband and converting baseband transmit signals to RF. In some descriptions a radio transceiver or RF transceiver may be understood to include other signal processing functionality such as modulation/demodulation, coding/decoding, interleaving/deinterleaving, spreading/despreading, inverse fast fourier transforming (IFFT)/fast fourier transforming (FFT), cyclic prefix appending/removal, and other signal processing functions. For the purposes of clarity the description here separates the description of this signal processing from the RF and/or radio stage and conceptually allocates that signal processing to the analog baseband processing unit 510 and/or the DSP 502 or other central processing unit. In some embodiments the RF transceiver 508, portions of the antenna and front end 506, the analog baseband processing unit 510 may be combined in one or more processing units and/or application specific integrated circuits (ASICs).

The analog baseband processing unit 510 may provide various analog processing of inputs and outputs, for example analog processing of inputs from the microphone 512 and outputs to the earpiece 514. To that end, the analog baseband processing unit 510 may have ports for connecting to the built-in microphone 512 and the earpiece speaker 514 that enable the handset 400 to be used as a cell phone. The analog baseband processing unit 510 may further include a port for connecting to a headset or other hands-free microphone and speaker configuration. The analog baseband processing unit 510 may provide digital-to-analog conversion in one signal direction and analog-to-digital conversion in the opposing signal direction. In some embodiments at least some of the functionality of the analog baseband processing unit 510 may be provided by digital processing components, for example by the DSP 502 or by other central processing units.

The DSP 502 may perform modulation/demodulation, coding/decoding, interleaving/deinterleaving, spreading/despreading, inverse fast fourier transforming (IFFT)/fast fourier transforming (FFT), cyclic prefix appending/removal, and other signal processing functions associated with wireless communications. In an embodiment, for example in a code division multiple access (CDMA) technology application, for a transmitter function the DSP 502 may perform modulation, coding, interleaving, and spreading and for a receiver function the DSP 502 may perform despreading, deinterleaving, decoding, and demodulation. In another embodiment, for example in an orthogonal frequency division multiplex access (OFDMA) technology application, for the transmitter function the DSP 502 may perform modulation, coding, interleaving, inverse fast fourier transforming, and cyclic prefix appending and for a receiver function the DSP 502 may perform cyclic prefix removal, fast fourier transforming, deinterleaving, decoding, and demodulation. In other wireless technology applications yet other signal processing functions and combinations of signal processing functions may be performed by the DSP 502.

The DSP 502 may communicate with a wireless network via the analog baseband processing unit 510. In some embodiments, the communication may provide Internet connectivity, enabling a user to gain access to content on the Internet and to send and receive e-mail or text messages. The input/output interface 518 interconnects the DSP 502 and various memories and interfaces. The memory 504 and the removable memory card (not shown) may provide software and data to configure the operation of the DSP 502. Among the interfaces may be the NFC transceiver card 520, the USB interface 522, and the infrared port 524. The NFC transceiver card 520 may promote communications between the handset 400 and the POS terminal 104. The USB interface 522 may enable the handset 400 to function as a peripheral device to exchange information with a personal computer or other computer system. The infrared port 524 and other optional ports such as a Bluetooth interface or an IEEE 802.11 compliant wireless interface may enable the handset 400 to communicate wirelessly with other nearby handsets and/or wireless base stations.

The input/output interface 518 may further connect the DSP 502 the biometric sensor 516 and to the accelerometer 526. The biometric sensor 516 may detect various biometric characteristics or signatures of a user and provide appropriate biometric input to the DSP 502 or other processor. The accelerometer 526 may serve as a mechanism to sense distinctive movements of the handset 400 and to provide appropriate motion input to the DSP 502 or other processor. In an embodiment, a different transducer may be employed to detect and/or sense distinctive movements of the handset 400.

The keypad 528 couples to the DSP 502 via the interface 518 to provide one mechanism for the user to make selections, enter information, and otherwise provide input to the handset 400. Another input mechanism may be the touch screen LCD 530, which may also display text and/or graphics to the user. The touch screen LCD controller 532 couples the DSP 502 to the touch screen LCD 530.

The CCD camera 534 enables the handset 400 to take digital pictures. The DSP 502 communicates with the CCD camera 534 via the camera controller 536. The GPS sensor 538 is coupled to the DSP 502 to decode global positioning system signals, thereby enabling the handset 400 to determine its position. In another embodiment, a camera operating according to a technology different from Charge Coupled Device cameras may be employed. Various other peripherals may also be included to provide additional functions, e.g., radio and television reception.

FIG. 12 illustrates a software environment 602 that may be implemented by the DSP 502. The DSP 502 executes operating system drivers 604 that provide a platform from which the rest of the software operates. The operating system drivers 604 provide drivers for the handset hardware with standardized interfaces that are accessible to application software. The operating system drivers 604 include application management services ("AMS") 606 that transfer control between applications running on the handset 400. Also shown in FIG. 12 are a web browser application 608, a media player application 610, and JAVA applets 612. The web browser application 608 configures the handset 400 to operate as a web browser, allowing a user to enter information into forms and select links to retrieve and view web pages. The media player application 610 configures the handset 400 to retrieve and play audio or audiovisual media. The JAVA applets 612 configure the handset 400 to provide games, utilities, and other functionality. An eWallet application 614, substantially similar to the electronic wallets 112 and 114, is also shown in FIG. 12. The software environment 602 may include other applications (not shown) including a VPN application, a spreadsheet application, an address book application, a scheduler application, a contact list application, and/or other applications.

Figure 13:
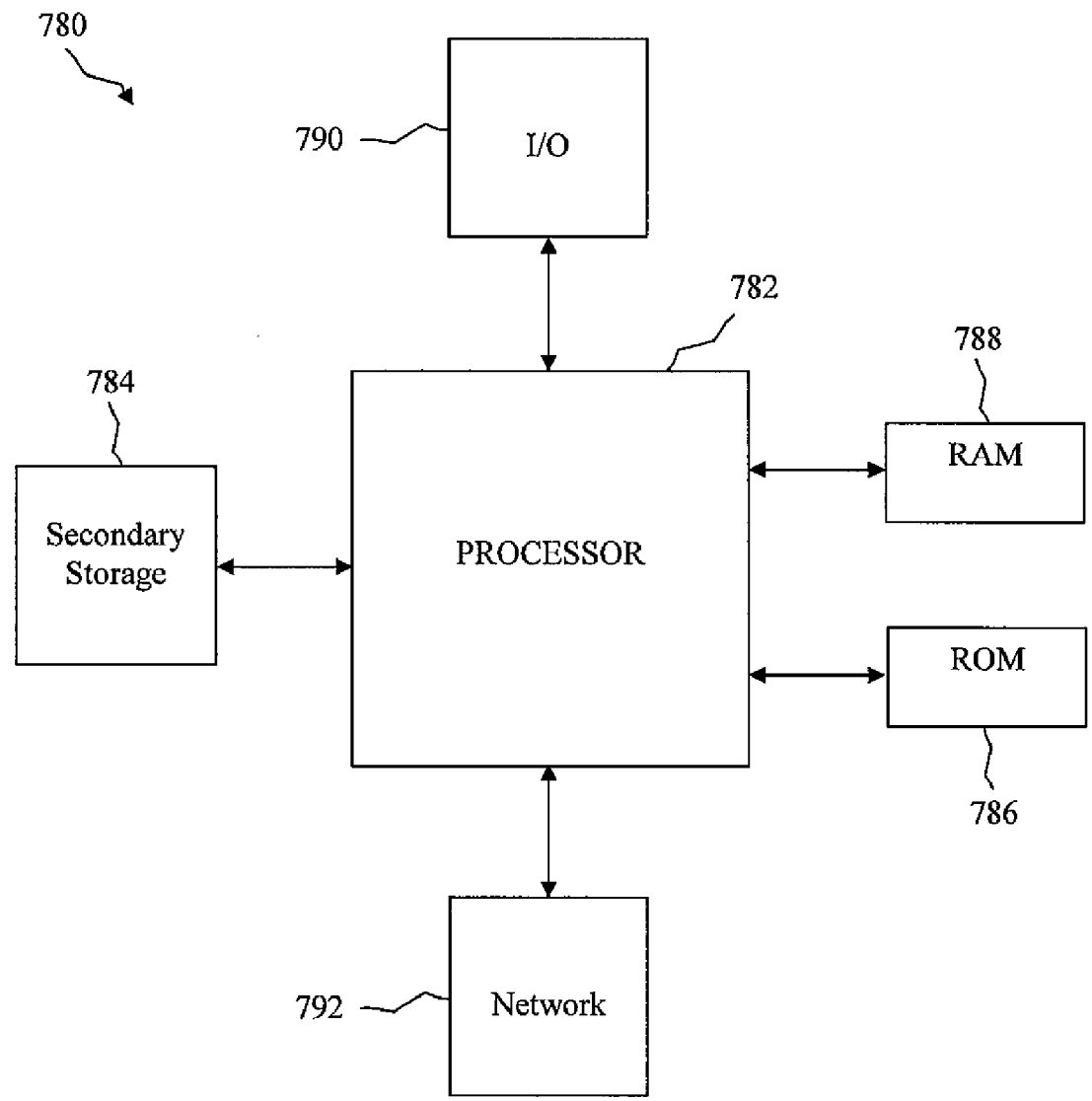
FIG. 13 illustrates an exemplary general purpose computer system suitable for implementing the several embodiments of the disclosure.

Portions of the system 100 described above, for example the POS terminal 104 and the payment authorization center 106, may be implemented on any general-purpose computer with sufficient processing power, memory resources, and network throughput capability to handle the necessary workload placed upon it. FIG. 13 illustrates a typical, general-purpose computer system suitable for implementing one or more embodiments disclosed herein. The computer system 780 includes a processor 782 (which may be referred to as a central processor unit or CPU) that is in communication with memory devices including secondary storage 784, read only memory (ROM) 786, random access memory (RAM) 788, input/output (I/O) devices 790, and network connectivity devices 792. The processor may be implemented as one or more CPU chips.

The secondary storage 784 is typically comprised of one or more disk drives or tape drives and is used for non-volatile storage of data and as an over-flow data storage device if RAM 788 is not large enough to hold all working data. Secondary storage 784 may be used to store programs which are loaded into RAM 788 when such programs are selected for execution. The ROM 786 is used to store instructions and perhaps data which are read during program execution. ROM 786 is a non-volatile memory device which typically has a small memory capacity relative to the larger memory capacity of secondary storage. The RAM 788 is used to store volatile data and perhaps to store instructions. Access to both ROM 786 and RAM 788 is typically faster than to secondary storage 784.

I/O devices 790 may include printers, video monitors, liquid crystal displays (LCDs), touch screen displays, keyboards, keypads, switches, dials, mice, track balls, voice recognizers, card readers, paper tape readers, or other well-known input devices. The network connectivity devices 792 may take the form of modems, modem banks, ethernet cards, universal serial bus (USB) interface cards, serial interfaces, token ring cards, fiber distributed data interface (FDDI) cards, wireless local area network (WLAN) cards, radio transceiver cards such as code division multiple access (CDMA) and/or global system for mobile communications (GSM) radio transceiver cards, and other well-known network devices. These network connectivity devices 792 may enable the processor 782 to communicate with an Internet or one or more intranets. With such a network connection, it is contemplated that the processor 782 might receive information from the network, or might output information to the network in the course of performing the above-described method steps. Such information, which is often represented as a sequence of instructions to be executed using processor 782, may be received from and outputted to the network, for example, in the form of a computer data signal embodied in a carrier wave Such information, which may include data or instructions to be executed using processor 782 for example, may be received from and outputted to the network, for example, in the form of a computer data baseband signal or signal embodied in a carrier wave. The baseband signal or signal embodied in the carrier wave generated by the network connectivity devices 792 may propagate in or on the surface of electrical conductors, in coaxial cables, in waveguides, in optical media, for example optical fiber, or in the air or free space. The information contained in the baseband signal or signal embedded in the carrier wave may be ordered according to different sequences, as may be desirable for either processing or generating the information or transmitting or receiving the information. The baseband signal or signal embedded in the carrier wave, or other types of signals currently used or hereafter developed, referred to herein as the transmission medium, may be generated according to several methods well known to one skilled in the art.

The processor 782 executes instructions, codes, computer programs, scripts which it accesses from hard disk, floppy disk, optical disk (these various disk based systems may all be considered secondary storage 784), ROM 786, RAM 788, or the network connectivity devices 792.

While several embodiments have been provided in the present disclosure, it should be understood that the disclosed systems and methods may be embodied in many other specific forms without departing from the spirit or scope of the present disclosure. The present examples are to be considered as illustrative and not restrictive, and the intention is not to be limited to the details given herein. For example, the various elements or components may be combined or integrated in another system or certain features may be omitted, or not implemented.

Also, techniques, systems, subsystems and methods described and illustrated in the various embodiments as discrete or separate may be combined or integrated with other systems, modules, techniques, or methods without departing from the scope of the present disclosure. Other items shown or discussed as coupled or directly coupled or communicating with each other may be indirectly coupled or communicating through some interface, device, or intermediate component whether electrically, mechanically, or otherwise. Other examples of changes, substitutions, and alterations are ascertainable by one skilled in the art and could be made without departing from the spirit and scope disclosed herein.

What is claimed is:

1. A method of activating an application, comprising:
   receiving inputs on a portable electronic device to configure an activation input to select activation of a hidden application of the portable electronic device;
   receiving the activation input; and
   activating the hidden application of the portable electronic device in response to receiving the activation input, wherein the hidden application of the portable electronic device is not accessible through any menu selection displayed on a visual display of the portable electronic device, wherein an electronic wallet is the hidden application, wherein the activation input further selects at least one of a credit card, a transit card, a debit card, a loyalty card, and a product coupon contained by the electronic wallet to be used to provide payment information, and wherein the activation input comprises a predetermined key selected concurrently with a distinctive movement cue or a distinctive camera image.

2. The method of claim 1, further including detecting a near field communication (NFC) signal of a point-of-sale terminal, and wherein the activating the hidden application is in response to detecting the NFC signal and to receiving the activation input.

3. The method of claim 1, wherein the activation input further selects one of a plurality of electronic wallets to activate.

* * * * *